Aug. 21, 1956     H. K. BIGELOW     2,759,516
MACHINE FOR LINING A BRAKE SHOE
Filed March 16, 1953     2 Sheets-Sheet 1

INVENTOR.
Harry K. Bigelow
BY Warren F. Schmeding
ATTORNEY.

Aug. 21, 1956 H. K. BIGELOW 2,759,516
MACHINE FOR LINING A BRAKE SHOE
Filed March 16, 1953 2 Sheets-Sheet 2

INVENTOR.
Harry K. Bigelow
BY
Warren H. F. Schmieding
ATTORNEY

United States Patent Office 2,759,516
Patented Aug. 21, 1956

2,759,516

MACHINE FOR LINING A BRAKE SHOE

Harry K. Bigelow, Columbus, Ohio

Application March 16, 1953, Serial No. 342,367

1 Claim. (Cl. 154—1)

The present invention relates to machines for lining brake shoes, and more particularly to a machine for bonding a brake liner to a brake shoe. In general, the machine includes a platen or anvil for supporting the assembled brake shoe and liner, a burner for heating the platen where heat is to be used in the bonding process, and means for applying and maintaining pressure over the surface between the brake shoe and liner during the bonding operation.

An object of the present invention is to provide an improvement in machines for lining brake shoes, which improvement consists of means whereby a bonded brake shoe and liner is moved and maintained away from a heated platen, automatically, after a predetermined time so that the bond and liner will not be damaged by excessive heating. In operation of bonding machines of the present type, a certain period of time is required for a brake shoe to be heated to the proper bonding temperature, and a certain additional period of time for the bonding agent to set. For example, 8 to 14 seconds are required to heat the top surface of a brake shoe to the required 540° F. by means of heat transfer to the shoe from a heated platen upon which an assembled shoe and liner is placed for bonding. An additional period of heating is required to properly set the bonding agent, with the duration of such additional period depending on the type of bonding agent being used. A certain bonding agent in common use requires 8 seconds to set after the brake shoe has been heated. Any additional heating, after setting of the bond, is excessive, such additional heating being extremely detrimental to the material from which brake liners are manufactured. The present invention provides means for moving a bonded brake shoe and liner away from a heated platen, and for suspending the brake and liner in insulated relationship above the heated platen. The liner and bond is thereby protected from excessive heating which is extremely detrimental to brake linings as such excessive heating causes materials in the linings to plasticize and become excessively hard. When a brake liner is plasticized to excessive hardness, the surface of the liner becomes smooth and the coefficient of friction of the liner is decreased with the result that the braking efficiency of the liner is greatly lessened. Moreover, the porosity of the liner material is destroyed by plasticization with the result that the liner is unable to "breathe," or pass off gases which are generated during operational heating, which heating occurs during operational use of the liners after they have been installed on a motor vehicle. Hence it is seen that even partial plasticization of a liner during bonding, due to excessive heating, will cause additional plasticization to occur more readily during operational use of the liner.

Another object of the present invention is to provide an improvement in machines of the character stated, which improvement consists of means for moving and supporting a brake shoe and liner, after bonding, away from the platen so that the shoe and liner can be readily grasped by the operator of the bonding machine. As a result, the rate of production of such machine is materially increased.

A further object of this invention is to provide an improvement in a machine for lining brake shoes, which improvement would consist of means for automatically moving and maintaining a bonded liner and brake shoe away from a heated platen so that the operator of the machine can remove the liner and shoe from the heated platen without danger of burning his hands.

For purposes of the present disclosure, only the platen structure of a brake lining machine is described and illustrated, along with related means for applying pressure to the platen. For a detailed description of other related portions of the machine, which are not herein shown or described, reference should be made to the co-pending application of Overman et al., Serial No. 98,988, filed June 14, 1949.

Further objects and advantages of the present invention will be apparent from the following description, reference being had to the accompanying drawing wherein a preferred form of embodiment of the invention is clearly shown.

Figure 1:
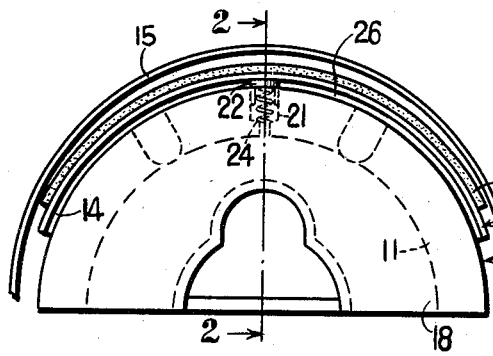
Fig. 1 is a side elevational view of a platen such as is utilized in machines for lining brake shoes and to which the present invention has been adapted.
Figure 2:
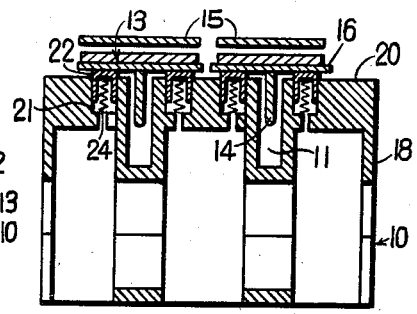
Fig. 2 is an end sectional view of the platen of Fig. 1 with the section being taken along the line 2—2 of Fig. 1.
Figure 3:
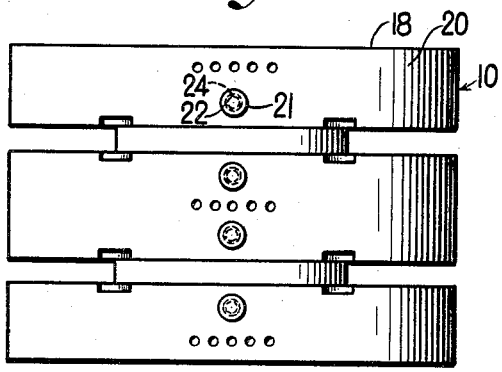
Fig. 3 is a top elevational view of the platen shown in the preceding figures.
Figure 4:
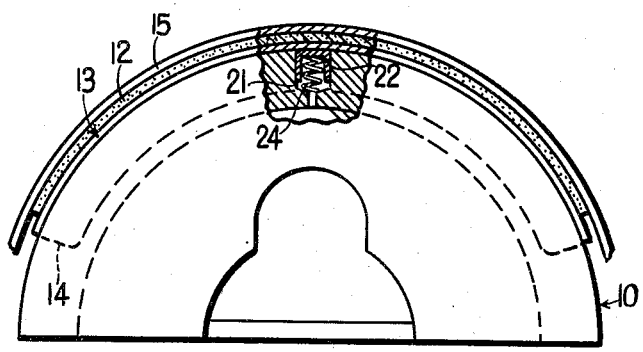
Fig. 4 is a side elevational view, partially in broken sections, showing the platen of the preceding figures, with a shoe and liner positioned thereon and strap means for applying pressure to the shoe and liner during bonding.

Referring further to the drawing, the platen illustrated is utilized in machines designed to bond liners on standard brake shoes such as are presently used on passenger vehicles and trucks. One of such platens is indicated generally at 10 in Figs. 1 through 4. A liner 12 is to be bonded to a shoe 13 by use of a bonding agent. A suitable bonding agent, in general, comprises a thermal setting resin which flows under the application of heat and pressure, or under pressure alone where a cold setting resin is used, to effect a bonding action between the shoe and liner. Any commercial grade of brake liner can be used. The application of heat or pressure, or combination of both heat and pressure, causes the bonding agent to react or flow. When the bonding agents sets, the liner is secured to the shoe.

Figure 6:
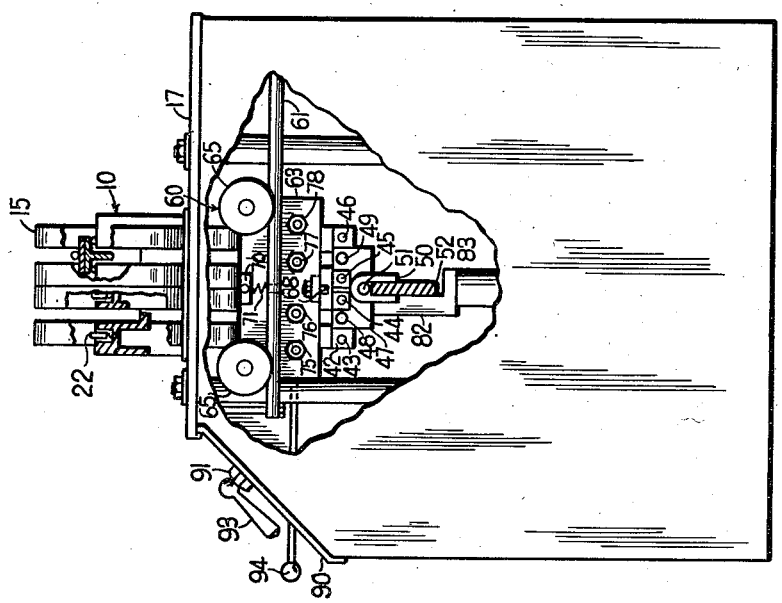
Figure 6 is a side elevational view of the machine of Figure 5.
Figure 5:
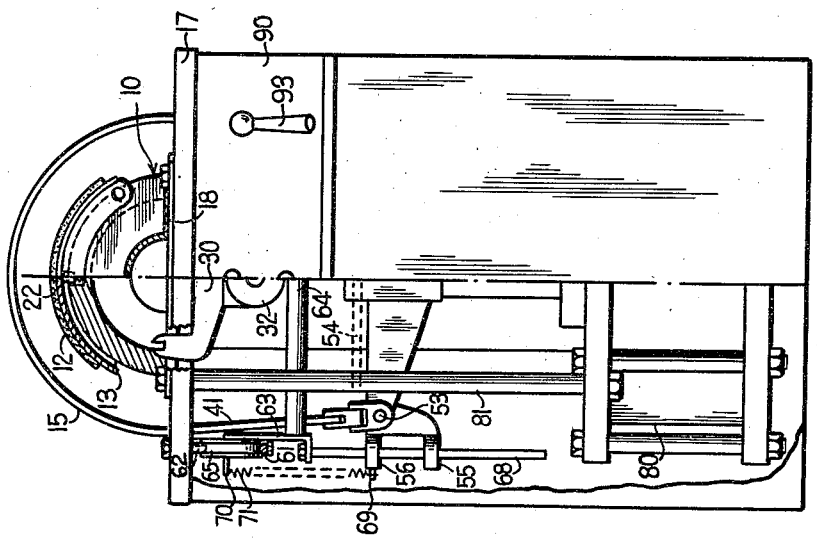
Figure 5 is a front elevational view of a machine for lining brake shoes which machine includes the platen of the preceding figures.

The element for applying pressure to the shoe and liner is preferably in the form of a flexible strap 15 which is normally arcuately curved in spaced relationship above the platen, as shown in Fig. 1. The strap 15 is moved downwardly to the position shown in Fig. 4 for applying pressure to the liner and shoe. A suitable mechanism shown in Figures 5 and 6 is employed for actuating the strap 15, upwardly and downwardly relative to the platen 10. Such mechanism may comprise a pneumatic cylinder 80 provided with suitable valving and linkage, as is described in detail in United States Letters Patent 2,653,644 dated September 29, 1953.

In the construction shown in Fig. 6 two of the straps 15 are provided for each shoe and liner assembly. Each strap is pivotally connected at its ends and held in an arcuate or bowed position as shown in Fig. 5. On each side of the machine the straps 15 have their ends pivotally connected to the plates 42, as indicated at 43, 44, 45 and 46. There are a pair of the plates 42 on each side and the ends of each pair of straps 15 are connected thereto as shown. Each plate 42 in turn is pivotally connected to the ends of the U-shaped bar 47 at the points 48 and 49. The bar 47, which is pivoted and free swinging, forms a singletree for applying a pulling force to plate 42. A clevis 50 is pivotally connected to the mid-point of bar 47 as indicated at 51. The clevis 50 is pivotally connected to the beam 52 as shown at 53 in Fig. 5. A compression spring 54 connected between the clevises provides for forcing the straps 15 outwardly on each side of the machine when the beam 52 is raised. When beam 52 is lowered the straps 15 are pulled downwardly and spring 54 is compressed. The beam 52 is bifurcated at each end and forms tines 55 and 56.

A movable carriage 60 supports the strap element 15 over the platen. A track 61 is provided for the carriage 60. The track is supported at each end from the top plate 17 by the hangers 62. The carriage chassis comprises a pair of plates 63 having a tie rod 64 connected between the plates for support. Rollers 65 connected to the plates support the chassis on the track. Each of the plates 63 is formed with an outwardly projecting flange which supports a guide pin 68. This guide pin extends freely through vertically aligned openings provided in the ends of the tines 55 and 56. As shown in Fig. 5, tine 56 is formed with an outwardly projecting pin 69. A pin 70 projects from the top of plate 63 on each side of the machine. The coil spring 71 is connected between the pins 69 and 70 and provides for holding the straps in the raised position when the beam 52 is disengaged from the pressure applying element 80 and when the carriage is in the back or retracted position. To move the carriage to the retracted position, a lever 94 is fastened to the carriage 60 as seen in Fig. 6. The lever 94 extends from the carriage through front panel 90 and such lever serves as a means to push or pull the carriage 60 whereby the carriage can be moved between retracted and operating positions. Spacing fingers in the form of short rods, indicated at 75, 76, 77 and 78, are bolted in spaced positions along the bottom edge of the plates 63 and project inwardly on each side of the machine. These fingers project between the straps 15 and form guide members when the straps are raised and lowered.

Means for applying a pulling force to the beam 52 can be of any suitable type, such as either a pneumatic or hydraulic cylinder assembly. In the preferred construction shown in Fig. 5, a pneumatic cylinder is indicated at 80 for this purpose. This assembly is supported from the top plate or bolster 17 with studs 81. A hook 82 is connected to the piston rod 83 of the cylinder 80. This hook is adapted to engage freely over the top of the beam 52, as shown in Figs. 5 and 6, and when the piston rod 83 is retracted applies a pulling force to the midpoint of beam 52. When the piston rod is raised and the carriage 60 is moved along the track 61, beam 52 moves from beneath the hook 82. Suitable interlocking mechanism, not shown, may be incorporated in the machine to prevent applying pressure through the cylinder when the carriage is in the back position. Such mechanism can be adapted to prevent moving the carriage to the back position when pressure is being applied.

Controls for operating the machine are located on the front panel 90. These controls include a heat regulator 91, a pressure regulator 92 and gauge, an air control valve 93 for the pneumatic cylinder assembly 80, and an operating lever 94 for shifting the carriage.

Referring particularly to the platen 10, it is seen that such platen is generally in the form of a hollow casting forming the side surfaces 18 and the top peripherial surface 20.

The platen 10 is formed with a plurality of grooves 11, with each groove providing clearance for a web portion 14 of a brake shoe so that the lower surface of the flange portion 16 can be compressed downwardly against the arcuate surface 20 of the platen by means of downward movement of the strap element 15.

The top peripherial surface of the platen is provided with a plurality of bores 21 each of which slidably carries a recessed button 22. A compression spring 24 is interposed between each button 22 and the bottom of its corresponding hole. When the springs 24 are in their normally uncompressed configuration, each of the buttons 22 will extend partially above the peripherial surface 20 of the platen.

The springs 24 are necessarily of sufficient strength to support a brake shoe and liner away from the arcuate surface 20 of the platen as is shown in Fig. 1. When the strap 15 is drawn downwardly against the upper surface of the lining 12, for the purpose of applying pressure during bonding, the springs 24 will be compressed, allowing the button 22 to move downwardly so that the upper surface of the button is flush with the arcuate surface 20 of the platen. In such compressed configuration, the lower surface of the brake shoe 13 will be in intimate contact with the surface 20 of the platen so that heat will be readily transferred, from the platen to the shoe, in instances where heat is utilized in the bonding process.

After the brake shoe and liner have been compressed downwardly against the platen for a predetermined time necessary for the proper setting of the bonding agent, the strap 15 will be raised upwardly, automatically, by suitable timing mechanism, not shown. With the upper raising of the strap 15, the spring-pressed button 22 will be urged upwardly, moving the brake shoe 13 upwardly and away from the heated surface 20 of the platen. An air space 26 will thereby be maintained between the shoe and the platen; such air space serves to insulate the shoe, liner, and bond from excessive heating, particularly in cases where the operator's attention has been drawn away from the machine, and he is not present for lifting the shoe and liner immediately away from the heated platen after the bond has set.

Hence it is seen that the present invention provides means for moving a bonded brake shoe and liner away from a heated platen, and for suspending the brake and liner in insulated relationship above the heated platen. Hence plasticization, due to excessive heat, is prevented, with the result that the original composition of the liner is maintained, having a high coefficient of friction for high braking efficiency.

While the form of embodiment of the present invention as herein disclosed constitutes a preferred form, it is to be understood that other forms might be adopted, all coming within the scope of the claim which follows:

A machine for lining a brake shoe, comprising in combination, an arcuately shaped platen adapted to receive, on its upper peripheral surface, an arcuately shaped brake shoe carrying a liner to be attached to the shoe; said platen being formed with an opening in said upper peripheral surface; an element forming a surface in confronting relationship with the upper periphery of the platen, said element being normally spaced from the liner and shoe; means for imparting relative movement between said platen and said element for applying pressure to the liner and the shoe; a recessed button slidably carried in said opening in said platen; and a compression spring positioned in said opening and seated on the bottom thereof and extending into the recess of the button, said spring normally urging said button to an extended position above the surface of said platen to engage the under surface of a shoe positioned over said platen to elevate and support the shoe above said platen when said element is in its normal spaced position.

References Cited in the file of this patent

UNITED STATES PATENTS

| | | |
|---|---|---|
| 2,443,693 | Paulsen | June 22, 1948 |
| 2,452,284 | Beare | Oct. 26, 1948 |
| 2,642,919 | Kingman | June 23, 1953 |